Patented Dec. 30, 1924.

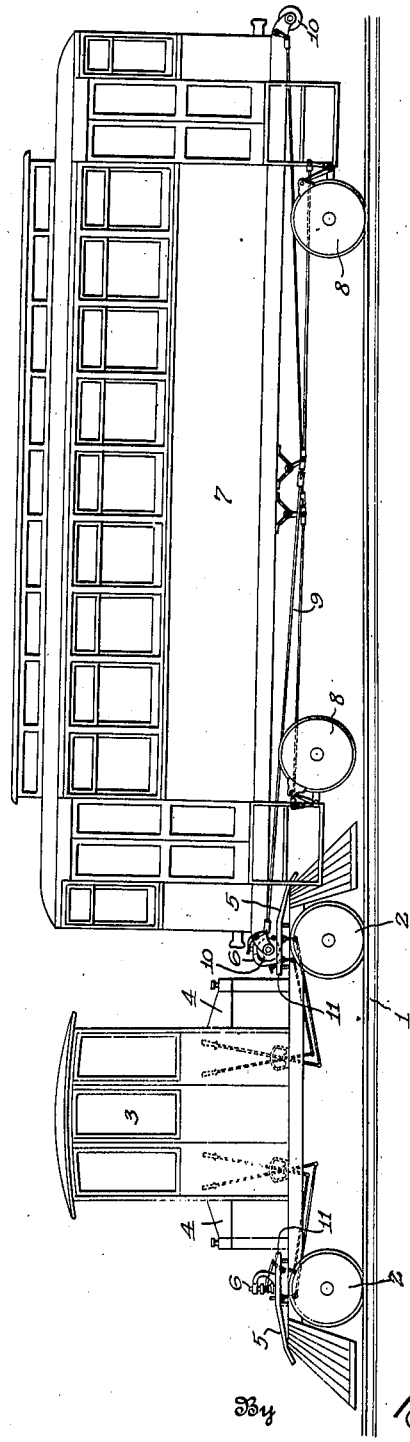

1,521,061

UNITED STATES PATENT OFFICE.

SIDNEY B. WINN, OF LAPEER, MICHIGAN.

DUPLEX TRACTOR.

Application filed November 24, 1922. Serial No. 602,930.

*To all whom it may concern:*

Be it known that I, SIDNEY B. WINN, a citizen of the United States of America, residing at Lapeer, in the county of Lapeer and State of Michigan, have invented certain new and useful Improvements in Duplex Tractors, of which the following is a specification, reference being had therein to the accompanying drawings.

This invention relates to a duplex tractor and has special reference to a double or universal tractor or locomotive adapted to have either end thereof connected to a trailer, car or other vehicle. The connection is established by placing either end of the tractor or locomotive under either end of the trailer or vehicle to raise a truck or set of wheels from the ground or track over which the vehicle is moved. In this manner an eight wheel train may be converted into a six wheel train, the proportion of wheel reduction depending on the number of wheels in each truck of the train.

The present invention is based on the coupling and uncoupling mechanism and brake mechanism set forth in my companion application, filed November 24, 1922, Ser. No. 602,929, such application disclosing tractor trailer combinations and the principle involved is applicable to railway rolling stock as well as road or street rolling stock, therefore I equip the ends of a railway car with brake and coupling and uncoupling mechanism, in addition to the usual couplers, so that when the brake mechanism of a car is set a locomotive or tractor may be backed or placed under one end of the car to elevate the end of the car and support it with its truck, adjacent the tractor or locomotive, off of the rails on which the truck travels. Then by releasing the brakes of the truck engaging the track or road, the tractor or locomotive may move the car. With the weight of one end of the trailer on the tractor, the tractive power of the tractor is materially increased. In order that the tractor or locomotive can be conveniently used, I use a four wheel drive and one or more power plants with a coupling and uncoupling mechanism for each end of the tractor or locomotive. Such will obviate the necessity of using turn-tables for reversing the tractor or locomotive, and it is obvious that the tractor or locomotive may be sandwiched between two cars in a train formation.

My invention will be hereinafter specifically described and then claimed, and reference will now be had to the drawing showing a side elevation of a train in accordance with my invention.

In the drawing the reference numeral 1 denotes a track and adapted to travel thereon are the trucks 2 of a tractor or locomotive 3, said tractor or locomotive having one or more power plants 4, car elevating end tracks 5, and coupling and uncoupling mechanisms 6.

The reference numeral 7 denotes a railway car or trailer having trucks 8 movable on the track 1 and said car is equipped with the usual couplers and a brake mechanism for each truck, generally designated 9, said brake mechanism being operatable from either end of the railway car.

At the ends of the railway car are wheels or rollers 10 adapted to engage the tracks 5 of the tractor or locomotive and ride upwardly on to platforms or turn tables 11 when one of the tracks is backed under an end of the railway car 7. Such backing operation is performed with the brakes of the railway car set, so that the railway car cannot back away from the tractor or locomotive. As the backing operation takes place the engaged end of the railway car is elevated and the truck 8 at such end of the car is removed from the track 1, so that the elevated end of the railway car is supported on the end of the tractor or locomotive. Backing under the end of the railway car accomplishes a coupling of the tractor or locomotive to the trailer or railway car, also releases the brakes of the track engaging truck of the trailer thus permitting of the tractor or locomotive moving the car. When the tractor leaves the trailer or car the brakes of each truck are set.

The mechanisms on the ends of the tractor or locomotive may be controlled from within the cab of the tractor or locomotive and this is also true of the brake mechanism of the trailer or railway car. Such arrangement permits of the driver or operator of the tractor or locomotive coupling or uncoupling trailers or cars at will, controlling the brakes of such trailers or cars, and readily observing traffic conditions incident to loading and unloading such trailers or cars.

In railway transportation I attach considerable importance to the fact that the locomotive is backed under the end of a car to elevate the car end and support it with one truck off of the track, and for street or road transportation I believe I am the first to use a duplex tractor for moving trailers with some of the ground engaging wheels elevated and ends of the trailers supported by ends of the tractor.

What I claim is:—

1. In a train formation, a car, a locomotive, means at each end of said locomotive to facilitate placing either end of said locomotive under an end of the car to elevate an end of the car and support it, and means on each end of said locomotive to effect coupling and uncoupling of the locomotive and car.

2. A train formation as called for in claim 1, wherein the car has a brake mechanism controlled through the coupling and uncoupling mechanism at either end of the locomotive.

3. The combination of a trailer having structurally alike ends, and a tractor adapted by a backing or forward movement to have an end thereof placed under either end of the trailer to elevate and support such end during transportation, said tractor and trailer having provision for coupling and uncoupling at will from the tractor.

4. A locomotive having a power plant, and a track on each end of said locomotive to permit of either end of said locomotive to be placed under a car to elevate and support the end of the car, and means on each end of the locomotive adapted for coupling the car to either end of the locomotive.

5. A locomotive having a track on each end thereof, a car, means at each end of the car to cause either end of the car to ride on to that end of the locomotive which may be placed under the car, and means coupling the locomotive and car.

6. The combination of a car having track engaging trucks and a brake mechanism for each truck, and a locomotive adapted to have an end thereof placed under an end of the car to raise the adjacent truck from the track and release the brakes of the track engaging truck.

7. The combination set forth in claim 6, and means on the locomotive adapted to establish an operative connection between the locomotive and car and permit of the brakes of the car being controlled.

8. The combination of a trailer having end trucks, and a tractor having structurally alike ends, either of which is adapted to sustain the weight of one end of the trailer with the end thereof elevated and said tractor in operative driving and controlling relation to said trailer.

9. In a train formation, a car, a locomotive, means at each end of said locomotive structurally alike to facilitate placing either end of said locomotive under either end of said car to elevate an end of said car and support it, and means at each end of the car to effect coupling and uncoupling of the locomotive and car.

10. The combination of a car, trucks adjacent the ends of said car, wheels at the ends of said car, a locomotive adapted to have an end thereof placed under the wheels at either end of said car to elevate the end of the car and its end truck with the wheels at the end of the car to be elevated facilitating such elevation, and means adapted for coupling the locomotive to the car.

In testimony whereof I affix my signature in presence of two witnesses.

SIDNEY B. WINN.

Witnesses:
ANNA M. DORR,
KARL H. BUTLER.